3,476,503
TREATMENT OF WOOL
Arno Rudolph Friedl, Hordle, Lymington, and Roger Gavin Dingley, Southampton, England, assignors to The International Synthetic Company Limited, Southampton, England, a corporation of the United Kingdom
No Drawing. Filed Feb. 28, 1966, Ser. No. 530,372
Claims priority, application Great Britain, Mar. 5, 1965, 9,480/65
Int. Cl. D06m 15/28
U.S. Cl. 8—128    8 Claims

ABSTRACT OF THE DISCLOSURE

A method of treating wool to improve shrinking and felting characteristics comprising contacting the wool with a modified rubbery polymer in a liquid carrier therefor under conditions which said polymer is deposited on the wool in proportion of at least 0.5% by weight of the wool, said polymer being a rubbery conjugated diene polymer having a minor proportion of its double bonds modified by the addition of anhydride groupings.

---

This invention relates to the treatment of wool, and relates in particular to the treatment of wool to improve its shrinkage and felting characteristics.

According to the present invention, a method of treating wool to improve its shrinkage and felting characteristics comprises bringing the wool into contact with a liquid in which is present an anhydride-modified rubbery polymer of a conjugated diene. The words "anhydride-modified rubbery polymer" are used in this specification to denote a substance derived from a rubbery polymer having carbon-to-carbon double bonds in its molecule but having a minor proportion of those bonds replaced by anhydride groupings. Preferably the proportion of the double bonds so replaced is within the range 1% to 20%.

Conveniently the anhydride-modified rubbery polymer used is one derived from a homopolymer of a conjugated diene, e.g. butadiene, isoprene or dimethylbutadiene, or from a copolymer (which includes interpolymers) of at least 50% of a conjugated diene and a vinyl monomer, e.g. styrene, vinyl toluene or divinylbenzene. Anhydride-modified rubbery polymers derived from polybutadienes and butadiene-styrene copolymers have been found particularly satisfactory in practice and are relatively inexpensive.

The conversion of the unmodified rubbery polymer into the anhydride-modified rubbery polymer may suitably be carried out by first carboxylating the rubbery polymer, i.e. converting some of the

groupings into groupings containing —COOH radicals, then modifying the latter to form anhydride groupings. The partial carboxylation may suitably be effected by treating the unmodified rubbery polymer with thioglycollic acid, i.e. HSCH₂COOH. Other suitable carboxylating agents are 2-mercapto succinic acid, 1-mercapto propionic acid, 2-mercapto propionic acid or ortho- or para-mercapto benzoic acids. The anhydride formation may suitably be effected by treatment with ketene, i.e. CH₂:CO, acetyl chloride, i.e. CH₃COCl, or acetic anhydride, i.e. (CH₃CO)₂O, to give anhydride groupings of the type

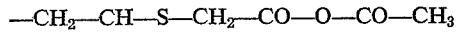

The liquid in which the anhydride-modified rubbery polymer is present, i.e. the liquid which the wool is brought into contact with, is preferably a solution of the anhydride-modified rubbery polymer in an organic solvent, e.g. toluene, benzene, carbon tetrachloride, or white spirit. The solution may be dilute, e.g. may contain only 0.5% to 2.0% by weight of the anhydride-modified rubbery polymer, and it may suitably be used at room temperature and in a single impregnation step. An emulsion may also be used. The impregnation may be carried out by immersing the wool in the solution, excess being removed by passing between squeeze-rollers or centrifuging, for instance. The duration of the contact of the wool and the liquid may be very short, i.e. merely a matter of seconds, durations of contact within the range of 3 to 120 seconds being generally sufficient. Normally no heat treatment is needed, even for the purpose of drying, but a short heat treatment at (e.g.) 100° C. may be carried out if required with the object of improving the retention of the anhydride-modified rubbery polymer by the wool in the presence of dry-cleaning solvents or other organic solvents.

The proportion of anhydride-modified rubbery polymer taken up by the wool in accordance with the present invention may be quite small, e.g. 0.5% to 2.5% by weight of the total. The wool is normally treated when in the form of a woven or knitted or other fabric, but the treatment may also if desired be applied to wool in yarn form or other non-fabricated form. The nonfabricated forms which may be treated include (besides yarns) rovings, slivers, unprepared fibres, felts and the like. The wool may be in dyed or undyed form; it may be in pure form (i.e. 100% wool) or in the form of a blend with other textile fibres, which may be natural an/or artificial; and it may be in chemically unmodified form or in reduced form. The reduced form of wool just referred to is that in which disulphide bonds in the wool molecules have been broken to give thiol groups, which it is believed, increase the number of sites on the wool molecules at which chemical modification may be effected; some examples of the reducing agents which may be used to produce this reduced form of wool are sulphites and bisulphites, and thioglycollic acid.

The treatment of wool in accordance with the present invention makes possible valuable improvements in respect of shrinkage-resistance or dimensional stability and of resistance to felting, even when the wool is washed with ordinary soap solutions or other orthodox detergent solutions. Valuable improvements are also obtainable in respect of resistance to attack by acids and in respect of resistance to creasing.

A particularly valuable improvement, however, is to be found in the fact that the proportion of anhydride-modified rubbery polymer required in accordance with the present invention, e.g. 0.5% to 2.5% by weight of the total, can be remarkably low in comparison with the proportions of additive required in comparable previously proposed processes.

Although it is not our intention to bind ourselves by any theoretical explanation of these improvements, we believe that the present treatment may result in the chemical modification of the wool at some of the sites in the wool fibre molecules at which there are reactive hydrogen atoms, e.g. reactive hydrogen atoms forming part of amino, imino, guanidino, aliphatic hydroxyl and phenolic hydroxyl and sulphydryl (i.e. mercapto or thiol) groups.

The following examples illustrate the invention.

The shrinkage figures are relaxation shrinkage plus shrinkage due to felting. The following standard shrinkage test was carried out. Fabrics were washed for one hour in an English Electric Liberator washing machine model 4021 at pH 7 in a phosphate buffer solution. The temperature of washing was 40° C. and a fabric to liquor ratio of 1:20 was used.

Example 1

Carboxylated polybutadiene was prepared by the reaction between polybutadiene and thioglycollic acid to give 5% modification, i.e. replacement by

—CH$_2$—CH—S—CH$_2$—COOH groupings of 5% of the double bonds available in the rubbery polymer.

The modified rubbery polymer (500 grams of a 3% solution in toluene) was reacted with ketene by passing the ketene gas through the solution for 15 minutes at room temperature. Infra-red analysis indicated formation of an anhydride-modified rubbery polymer.

A sample of wool fabric was immersed for 60 seconds in a 1% solution of the above modified rubbery polymer run through squeeze rollers to remove excess liquid, and allowed to dry in air. The fabric was found on analysis to have taken up 2% of the modified rubbery polymer. Its shrinkage on washing was only 2%, compared with 65% for the untreated fabric, and the time taken for it to dissolve in boiling 5 N hydrochloric acid was 3 hours, compared with only 15 minutes for the untreated fabric.

A specimen of the treated fabric was extracted for 24 hours with toluene at 50° C. and 50% of the modified rubbery polymer was found to remain attached to the wool fabric, i.e. 1% rubbery polymer on the total weight of the fabric. The low shrinkage figure of 2% was observed in the fabric after washing.

A further specimen of the treated fabric was heated for 10 minutes at 100° C. After extraction with toluene at 50° C. for 24 hours, 75% of the modified rubbery polymer was found to remain attached to the wool fabric, i.e. 1.5% rubbery polymer on the total weight of the fabric.

Example 2

Carboxylated polybutadiene was prepared as in Example 1, and 500 grams of a 5% solution in toluene of the 5% carboxylated rubbery polymer were heated with acetyl chloride (5 grams) for 2 hours at 70° C. Infra-red analysis indicated some anhydride formation.

A sample of wool fabric was immersed for 60 seconds in a 1% solution of the above modified rubbery polymer. The fabric was allowed to dry in air. 1.8% of the modified rubbery polymer on the weight of fabric was found to have been picked up. A 2% shrinkage after washing was measured.

Example 3

A solution of a 5% carboxylated styrene-butadiene copolymer derived from thioglycollic acid and a plain styrene-butadiene copolymer (500 grams of a 3% solution in toluene of the carboxylated rubbery polymer) was reacted with ketene for 15 minutes as described in Example 1. Wool fabric was immersed in a 1% solution of the modified rubbery polymer for 5 seconds. 2% of the modified rubbery polymer on the weight of fabric was found to have been taken up.

The fabric was allowed to dry at room temperature. A shrinkage of less than 2% was measured.

What is claimed is:
1. A method of treating wool to improve shrinking and felting characteristics comprising contacting the wool with a modified rubbery polymer in a liquid carrier therefor under conditions which said polymer is deposited on the wool in proportion of at least 0.5% by weight of the wool, said polymer being a rubbery conjugated diene polymer having a minor proportion of its double bonds modified by the addition of anhydride groupings.

2. A method of treating wool according to claim 1 in which from 0.5% to 2.5% of the modified rubbery polymer is deposited on the wool.

3. A method of treating wool according to claim 1 in which the rubbery conjugated diene polymer is a homopolymer of a conjugated diene selected from the group consisting of butadiene, isoprene and dimethyl butadiene.

4. A method of treating wool according to claim 1 in which the rubbery conjugated diene polymer is a co-polymer of a conjugated diene and a vinyl monomer selected from the group consisting of styrene, vinyl toluene, and divinyl benzene.

5. A method of treating wool according to claim 1 in which the rubbery conjugated diene polymer has from 1% to 20% of its double bonds modified by the addition of anhydride groupings.

6. A method of treating wool according to claim 1 in which the liquid carrier is an organic solvent for the modified rubbery polymer.

7. A method of treating wool according to claim 6 in which the concentration of the modified rubbery polymer in the organic liquid carrier is from 0.5% to 2.0% by weight.

8. A method of treating wool to improve shrinking and felting characteristics comprising contacting the wool with a modified rubbery polymer, which is a rubbery homopolymer of butadiene having from 1% to 20% of its double bonds modified by the addition of anhydride groupings, together with an organic solvent so that from 0.5% to 2.5%, based on the dry weight of the wool, of the modified rubbery polymer is deposited on the wool, followed by removal of the solvent.

References Cited

UNITED STATES PATENTS 2,499,653   3/1950   Kropa et al. _____ 8—128 X

RICHARD D. LOVERING, Primary Examiner

U.S. Cl. X.R.

8—112; 117—139.4